United States Patent
Nunoo et al.

(10) Patent No.: US 12,401,053 B2
(45) Date of Patent: Aug. 26, 2025

(54) ELECTROLYTE MEMBRANE, MEMBRANE ELECTRODE ASSEMBLY, ELECTROCHEMICAL CELL, AND METHOD FOR MANUFACTURING ELECTROLYTE MEMBRANE

(71) Applicant: Panasonic Intellectual Property Management Co., Ltd., Osaka (JP)

(72) Inventors: Kosuke Nunoo, Osaka (JP); Tomohiro Kuroha, Osaka (JP); Hiroshi Asano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 610 days.

(21) Appl. No.: 17/806,501

(22) Filed: Jun. 13, 2022

(65) Prior Publication Data

US 2022/0311036 A1    Sep. 29, 2022

Related U.S. Application Data

(63) Continuation of application No. PCT/JP2020/045748, filed on Dec. 9, 2020.

(30) Foreign Application Priority Data

Jan. 7, 2020 (JP) .................. 2020-000909

(51) Int. Cl.
*H01M 8/1016*    (2016.01)
*C01G 25/00*    (2006.01)
(Continued)

(52) U.S. Cl.
CPC ........ *H01M 8/1004* (2013.01); *C01G 25/006* (2013.01); *H01M 8/1016* (2013.01);
(Continued)

(58) Field of Classification Search
CPC ............. H01M 8/1004; H01M 8/1016; H01M 2300/0071; C01G 25/006; B32B 18/00;
(Continued)

(56) References Cited

U.S. PATENT DOCUMENTS

2017/0288248 A1    10/2017    Mikami et al.
2017/0288251 A1*   10/2017    Kamata ............... B01D 53/00
(Continued)

FOREIGN PATENT DOCUMENTS

EP    3229298 A1    10/2017
JP    2017-188439 A    10/2017
(Continued)

OTHER PUBLICATIONS

Sung_Park_Elsevier_Feb_2010 Low Temperature sintering of . . . (Year: 2010).*
(Continued)

*Primary Examiner* — Milton I Cano
*Assistant Examiner* — Katherine J Metzger
(74) *Attorney, Agent, or Firm* — Rimon P.C.

(57) ABSTRACT

The electrolyte membrane of the present disclosure includes a plurality of crystal domains. At least one of the crystal domains includes a first crystal subdomain and a second crystal subdomain. Each of the first crystal subdomain and the second crystal subdomain includes Ba, Zr, M, and O. M is a trivalent element. The concentration of M in the first crystal subdomain is different from the concentration of M in the second crystal subdomain.

6 Claims, 10 Drawing Sheets

(51) Int. Cl.
*H01M 8/1004* (2016.01)
*H01M 8/1246* (2016.01)

(52) U.S. Cl.
CPC ....... *H01M 8/1246* (2013.01); *C04B 2235/75* (2013.01); *C04B 2235/768* (2013.01); *H01M 2300/0071* (2013.01)

(58) Field of Classification Search
CPC .................. C04B 35/01; C04B 35/486; C04B 2235/3215; C04B 2235/3224; C04B 2235/3244; C04B 2235/75; C04B 2235/80; C04B 35/488; C04B 35/50; C04B 2235/3248; C04B 2235/768; C04B 2237/348; C01P 2002/52
See application file for complete search history.

(56) References Cited

U.S. PATENT DOCUMENTS

| 2017/0301925 A1 | 10/2017 | Yamauchi et al. |
| 2021/0005916 A1 | 1/2021 | Higashino et al. |
| 2021/0234183 A1 | 7/2021 | Nishimoto et al. |

FOREIGN PATENT DOCUMENTS

| JP | 2018-088384 | 6/2018 | |
| WO | WO-2018230247 A1 * | 12/2018 | ............. C01B 3/503 |
| WO | 2019/107194 | 6/2019 | |
| WO | 2020/045540 A1 | 3/2020 | |

OTHER PUBLICATIONS

WO2018230247_Translation (Year: 2018).*
Bi_et_al._MRS_June_2014_Synthesis_strategies_.pdf(Year: 2014).*
International Search Report of PCT application No. PCT/JP2020/045748 dated Feb. 22, 2021.
EPC Office Action dated May 30, 2023 for the related European Patent Application No. 20912823.0.
Park J S et al, "Low temperature sintering of BaZrO3-based proton conductors for intermediate temperature solid oxide fuel cells", Solid State Ionics, North Holland Pub. Company. Amsterdam; NL, NL, vol. 181, No. 3-4, Feb. 24, 2010, pp. 163-167, XP026938973.
Han Donglin et al, "Microstructure, Proton Concentration and Proton Conductivity of Barium Zirconate Doped with Ho, Er, Tm and Yb", Journal of the Electrochemical Society, vol. 163, No. 6, Jan. 1, 2016, pp. F470-F476, XP093047209.
S. Imashuku et al, "Dependence of Dopant Cations on Microstructure and Proton Conductivity of Barium Zirconate", Journal of the Electrochemical Society, vol. 156, No. 1, Jan. 1, 2009, p. B1, XP055216784.

* cited by examiner

FIG. 7

| Yb PROPORTION | FREQUENCY (%) | Yb PROPORTION | FREQUENCY (%) | Yb PROPORTION | FREQUENCY (%) |
|---|---|---|---|---|---|
| 0.01 | 0.00 | 0.21 | 16.99 | 0.41 | 0.01 |
| 0.02 | 0.00 | 0.22 | 11.88 | 0.42 | 0.01 |
| 0.03 | 0.00 | 0.23 | 6.85 | 0.43 | 0.02 |
| 0.04 | 0.00 | 0.24 | 3.78 | 0.44 | 0.01 |
| 0.05 | 0.00 | 0.25 | 2.02 | 0.45 | 0.01 |
| 0.06 | 0.00 | 0.26 | 0.85 | 0.46 | 0.00 |
| 0.07 | 0.00 | 0.27 | 0.56 | 0.47 | 0.00 |
| 0.08 | 0.00 | 0.28 | 0.33 | 0.48 | 0.00 |
| 0.09 | 0.00 | 0.29 | 0.27 | 0.49 | 0.01 |
| 0.10 | 0.00 | 0.30 | 0.30 | 0.50 | 0.00 |
| 0.11 | 0.00 | 0.31 | 0.11 | | |
| 0.12 | 0.01 | 0.32 | 0.16 | | |
| 0.13 | 0.00 | 0.33 | 0.14 | | |
| 0.14 | 0.08 | 0.34 | 0.05 | | |
| 0.15 | 0.46 | 0.35 | 0.09 | | |
| 0.16 | 1.71 | 0.36 | 0.05 | | |
| 0.17 | 5.08 | 0.37 | 0.04 | | |
| 0.18 | 11.17 | 0.38 | 0.03 | | |
| 0.19 | 17.17 | 0.39 | 0.02 | | |
| 0.20 | 20.40 | 0.40 | 0.01 | | |

FIG. 11

| Yb PROPORTION | FREQUENCY (%) | Yb PROPORTION | FREQUENCY (%) | Yb PROPORTION | FREQUENCY (%) |
|---|---|---|---|---|---|
| 0.01 | 0.00 | 0.21 | 17.23 | 0.41 | 0.00 |
| 0.02 | 0.00 | 0.22 | 12.53 | 0.42 | 0.00 |
| 0.03 | 0.00 | 0.23 | 7.78 | 0.43 | 0.00 |
| 0.04 | 0.00 | 0.24 | 4.49 | 0.44 | 0.00 |
| 0.05 | 0.00 | 0.25 | 2.36 | 0.45 | 0.00 |
| 0.06 | 0.00 | 0.26 | 1.21 | 0.46 | 0.00 |
| 0.07 | 0.00 | 0.27 | 0.60 | 0.47 | 0.00 |
| 0.08 | 0.00 | 0.28 | 0.21 | 0.48 | 0.00 |
| 0.09 | 0.00 | 0.29 | 0.11 | 0.49 | 0.00 |
| 0.10 | 0.00 | 0.30 | 0.04 | 0.50 | 0.00 |
| 0.11 | 0.00 | 0.31 | 0.02 | | |
| 0.12 | 0.00 | 0.32 | 0.01 | | |
| 0.13 | 0.01 | 0.33 | 0.00 | | |
| 0.14 | 0.03 | 0.34 | 0.00 | | |
| 0.15 | 0.29 | 0.35 | 0.00 | | |
| 0.16 | 1.44 | 0.36 | 0.00 | | |
| 0.17 | 4.71 | 0.37 | 0.00 | | |
| 0.18 | 10.84 | 0.38 | 0.00 | | |
| 0.19 | 16.88 | 0.39 | 0.00 | | |
| 0.20 | 19.21 | 0.40 | 0.00 | | |

FIG. 14

| Yb PROPORTION | FREQUENCY (%) | Yb PROPORTION | FREQUENCY (%) | Yb PROPORTION | FREQUENCY (%) |
|---|---|---|---|---|---|
| 0.01 | 0.00 | 0.21 | 18.56 | 0.41 | 0.00 |
| 0.02 | 0.00 | 0.22 | 13.68 | 0.42 | 0.00 |
| 0.03 | 0.00 | 0.23 | 8.57 | 0.43 | 0.00 |
| 0.04 | 0.00 | 0.24 | 4.72 | 0.44 | 0.00 |
| 0.05 | 0.00 | 0.25 | 1.88 | 0.45 | 0.00 |
| 0.06 | 0.00 | 0.26 | 0.88 | 0.46 | 0.00 |
| 0.07 | 0.00 | 0.27 | 0.30 | 0.47 | 0.00 |
| 0.08 | 0.00 | 0.28 | 0.05 | 0.48 | 0.00 |
| 0.09 | 0.00 | 0.29 | 0.03 | 0.49 | 0.00 |
| 0.10 | 0.00 | 0.30 | 0.02 | 0.50 | 0.00 |
| 0.11 | 0.00 | 0.31 | 0.00 | | |
| 0.12 | 0.00 | 0.32 | 0.00 | | |
| 0.13 | 0.01 | 0.33 | 0.00 | | |
| 0.14 | 0.10 | 0.34 | 0.00 | | |
| 0.15 | 0.39 | 0.35 | 0.00 | | |
| 0.16 | 1.48 | 0.36 | 0.00 | | |
| 0.17 | 4.73 | 0.37 | 0.00 | | |
| 0.18 | 9.91 | 0.38 | 0.00 | | |
| 0.19 | 15.52 | 0.39 | 0.00 | | |
| 0.20 | 19.18 | 0.40 | 0.00 | | | ns
ELECTROLYTE MEMBRANE, MEMBRANE ELECTRODE ASSEMBLY, ELECTROCHEMICAL CELL, AND METHOD FOR MANUFACTURING ELECTROLYTE MEMBRANE

BACKGROUND

1. Technical Field

The present disclosure relates to an electrolyte membrane, a membrane electrode assembly, and a method for manufacturing the electrolyte membrane of an electrochemical cell.

2. Description of the Related Art

As an electrolyte material having a proton conductivity, a perovskite-type ion conductor of which the chemical formula is $BaZr_{1-x}M_xO_{3-\alpha}$ (M is a trivalent substitution element) has been known.

Japanese Unexamined Patent Application Publication No. 2018-88384 discloses $BaZr_{1-x}M_xO_{3-\alpha}$ (M is at least one element selected from Sc, In, Lu, and Yb, and $0<x<1$).

SUMMARY

One non-limiting and exemplary embodiment provides an electrolyte membrane having a high proton conductivity.

In one general aspect, the techniques disclosed here feature an electrolyte membrane including a plurality of crystal domains. Here, at least one crystal domain includes a first crystal subdomain and a second crystal subdomain, each of the first crystal subdomain and the second crystal subdomain includes Ba, Zr, M, and O, where M is a trivalent element, and the concentration of M in the first crystal subdomain is different from the concentration of M in the second crystal subdomain.

The present disclosure provides an electrolyte membrane having high proton conductance.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 shows the ratio of Yb at each analysis point of the membrane electrode assembly of Example 1;

FIG. 11 shows the ratio of Yb at each analysis point of the membrane electrode assembly of Example 2;

FIG. 14 shows the ratio of Yb at each analysis point of the membrane electrode assembly of Comparative Example 1.

DETAILED DESCRIPTIONS

Definition of Term

The term "STEM" used in the present specification means a scanning transmission electron microscope.

The term "FE-EPMA" used in the present specification means a field emission electron probe microanalyzer.

The term "EDX" used in the present specification means energy dispersive X-rays.

Embodiments of the present disclosure will now be described in detail with reference to the drawings.

Embodiment 1

Figure 1:
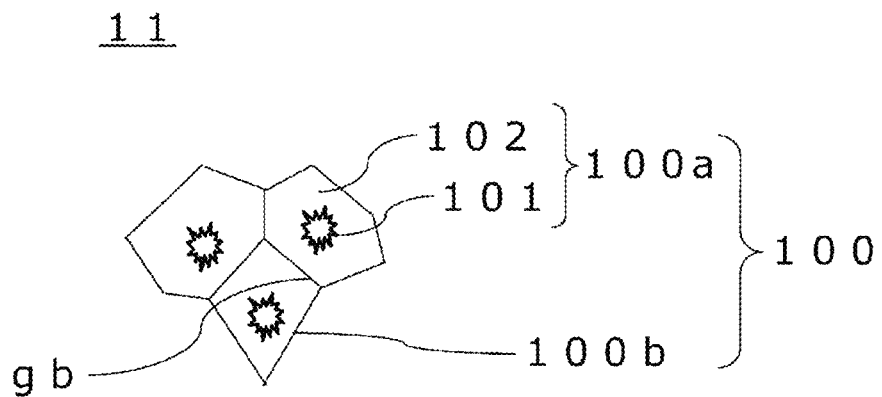
FIG. 1 schematically illustrates a cross-sectional STEM image of an electrolyte membrane according to an embodiment.

FIG. 1 schematically illustrates a cross-sectional STEM image of an electrolyte membrane 11 according to an embodiment 1.

Figure 5:
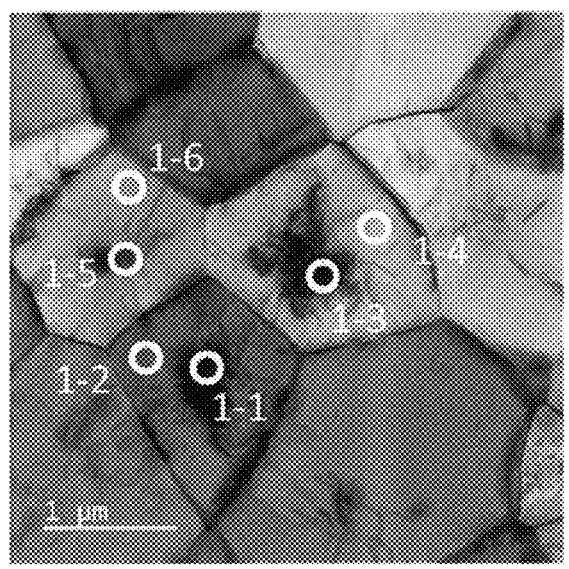
FIG. 5 is a cross-sectional STEM image of an electrolyte membrane of Example 1.
Figure 9:
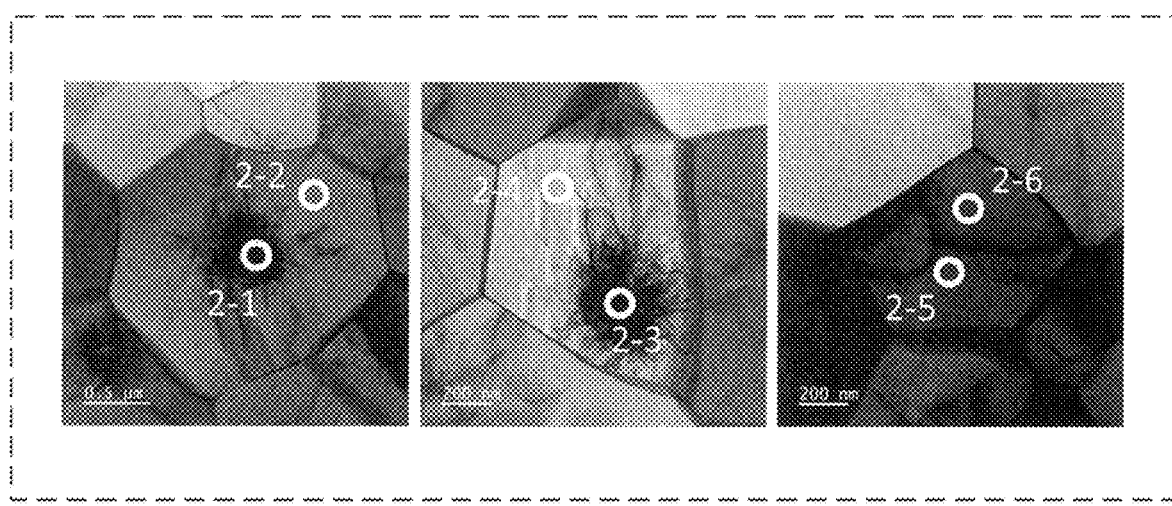
FIG. 9 shows cross-sectional STEM images of the electrolyte membrane of Example 2.

As shown in FIGS. 5 and 9 which are cross-sectional STEM images of electrolyte membranes 11 obtained in Examples 1 and 2 described later, each electrolyte membrane 11 is constituted of a plurality of crystal domains 100. The plurality of crystal domains 100 includes a first crystal domain 100a and a second crystal domain 100b.

As shown in FIG. 1, each crystal domain 100 is constituted of a first crystal subdomain 101 and a second crystal subdomain 102. In other words, at least one crystal domain 100 includes a first crystal subdomain 101 and a second crystal subdomain 102 in the inside thereof.

A grain boundary gb is formed between two adjacent crystal domains 100 (e.g., between a first crystal domain 100a and a second crystal domain 100b). The grain boundary gb defines the boundary of two adjacent crystal domains. Each crystal domain 100 in the STEM image is surrounded by a plurality of grain boundaries gb. In other words, each crystal domain 100 in the STEM image is defined by a plurality of grain boundaries gb.

The first crystal subdomain 101 and the second crystal subdomain 102 each include Ba, Zr, M, and O, where M is a trivalent element. M may be, for example, at least one element selected from Sc, In, Lu, and Yb. The concentration of M in the first crystal subdomain 101 and the concentration of M in the second crystal subdomain 102 are different from each other. In the embodiment 1, for example, the concentration of M in the first crystal subdomain is higher than the concentration of M in the second crystal subdomain, and in addition thereto, the first crystal subdomain 101 is surrounded by the second crystal subdomain 102 in the inside of each crystal domain 100.

In the embodiment 1, M is, for example, Yb, and the first crystal subdomain and the second crystal subdomain are constituted of oxides represented by $BaZr_{1-a}Yb_aO_{3-\delta}$ and $BaZr_{1-b}Yb_bO_{3-\delta}$, respectively (here, $0<a<1$, $0<b<$, $0<\delta<1$, and $(a-b)\geq 0.28$).

As demonstrated in Examples 1 and 2 described later, when the concentration of M in the first crystal subdomain 101 and the concentration of M in the second crystal subdomain 102 are different from each other, the electrolyte membrane 11 according to the embodiment 1 has a high proton conductivity at temperatures of 500 degrees Celsius or more and 700 degrees Celsius or less. Although Examples 1 and 2 show examples of using Yb as the M, even if other elements are used, as long as the concentration of M in the first crystal subdomain 101 and the concentration of M in the second crystal subdomain 102 are different from each other, a high proton conductivity is exhibited at temperatures of 500 degrees Celsius or more and 700 degrees Celsius or less.

When there is no crystal subdomain, that is, when the concentration of M in the first crystal subdomain 101 and the concentration of M in the second crystal subdomain 102 are substantially the same, as demonstrated in Comparative Example 1 described later, the proton conductivity at temperatures of 500 degrees Celsius or more and 700 degrees Celsius or less is 0.22 ($10^{-2}$ s·cm$^{-1}$) or less. Thus, when there is no crystal subdomain, the proton conductivity is low when compared at the same temperature condition.

Here, the phrase "the concentration of M in the first crystal subdomain and the concentration of M in the second crystal subdomain are substantially the same" means that any of the following cases is satisfied:

(i) in $BaZr_{1-a}M_aO_{3-\delta}$ included in the first crystal subdomain and $BaZr_{1-b}M_bO_{3-\delta}$ included in the second crystal subdomain, $(a-b)\leq 0.156$ is satisfied;

(ii) the value of "(the maximum value of wt % of M)−(the average value of wt % of M)" per unit area of the data output by analysis of a 3×3 μm area of the electrolyte membrane with an electron probe microanalyzer as described later is 2.0% or less; and (iii) the ratio of M determined by FE-EPMA analysis as described later is within a range of the average composition value+0.1 (i.e., $c+0.1\geq x$).

In this case, the phrase "the concentration of M in the first crystal subdomain and the concentration of M in the second crystal subdomain are different from each other" means the following cases:

(i) in $BaZr_{1-a}M_aO_{3-\delta}$ included in the first crystal subdomain and $BaZr_{1-b}M_bO_{3-\delta}$ included in the second crystal subdomain, $(a-b)>0.156$ is satisfied;

(ii) the value of "(the maximum value of wt % of M)−(the average value of wt % of M)" per unit area of the data output by analysis of a 3×3 μm area of the electrolyte membrane with an electron probe microanalyzer is higher than 2.0%; and (iii) the ratio of Yb determined by FE-EPMA analysis is outside a range of the average composition value+0.1 (i.e., $c+0.1<x$).

As demonstrated in Examples 1 and 2, when the value of (a−b) is 0.28 or more, the electrolyte membrane 11 according to the embodiment 1 has a high proton conductivity at temperatures of 500 degrees Celsius or more and 700 degrees Celsius or less.

When the value of (a−b) is smaller than 0.28, for example, in the case of $(a-b)\leq 0.156$, as demonstrated in Comparative Example 1 described later, the proton conductivity at temperatures of 500 degrees Celsius or more and 700 degrees Celsius or less is 0.22 ($10^{-2}$ s·cm$^{-1}$) or less. In the unlikely event that the value of (a−b) is smaller than 0.28, the proton conductivity is low when compared at the same temperature condition.

In more detail, at a temperature within a range of 500 degrees Celsius or more and 700 degrees Celsius or less, an electrolyte membrane having an (a−b) value of 0.28 or more (i.e., the electrolyte membrane according to the embodiment 1) has a proton conductivity higher than that of an electrolyte membrane having an (a−b) value of less than 0.28. As an example, although an electrolyte membrane having an (a−b) value of 0.28 or more at a temperature of 600 degrees Celsius (i.e., the electrolyte membrane according to the embodiment 1) has a high proton conductivity of 0.24 ($10^{-2}$ s·cm$^{-1}$) or more, an electrolyte membrane having an (a−b) value of less than 0.28 has a proton conductivity of 0.21 ($10^{-2}$ s·cm$^{-1}$) or less.

Desirably, the mathematical expression $(a-b)\geq 0.30$ is satisfied. Further desirably, the mathematical expression $(a-b)\geq 0.35$ is satisfied. The value of "a" is the amount of Zr deficiency (in other words, the amount of Yb dopant). The value of "δ" is the amount of oxygen deficiency. The value of "δ" satisfies $0<\delta<1$.

Analysis of a cross-section of the electrolyte membrane 11 according to the embodiment 1 with an FE-EPMA reveals that the electrolyte membrane 11 contains a barium zirconate compound doped with ytterbium, as demonstrated in Examples 1 and 2 described later. The value of "(the maximum value of wt % of Yb)−(the average value of wt % of Yb)" (hereinafter, may be referred to as "Yb difference") per unit area of the data output by analysis with the FE-EPMA is 5% or more. An electrolyte membrane having an Yb difference of 5% or more at a temperature of 500 degrees Celsius or more and 700 degrees Celsius or less has a proton conductivity higher than that of an electrolyte membrane having an Yb difference of lower than 5%. In an example, a high proton conductivity of 0.24 ($10^{-2}$ s·cm$^{-1}$) or more is exhibited at a temperature of 600 degrees Celsius. When the Yb difference is less than 5%, for example, 2.0% or less, as demonstrated in Comparative Example 1, a low proton conductivity of 0.21 ($10^{-2}$ s·cm$^{-1}$) is exhibited at a temperature of 600 degrees Celsius.

Further desirably, the Yb difference is 6% or more. An electrolyte membrane having an Yb difference of 6% or more at temperatures of 500 degrees Celsius or more and 700 degrees Celsius or less has a high proton conductivity of 0.24 ($10^{-2}$ s·cm$^{-1}$) or more. In the unlikely event that the Yb difference is lower than 6%, as demonstrated in Example 2 and Comparative Example 1, a low proton conductivity of 0.19 ($10^{-2}$ s·cm$^{-1}$) or less is exhibited at a temperature of 500 degrees Celsius.

When a cross-section of the electrolyte membrane 11 according to the embodiment 1 is analyzed, as demonstrated in Examples 1 and 2, it is clarified that a 3×3 μm square region represented by a composition formula of $BaZr_{1-x}Yb_xO_{3-\delta}$ (here, $0<c<1$, $(c+0.1)<x$, and $0<\delta<1$) is present on an electrolyte membrane. Here, the value of "x" is the amount of Zr deficiency (in other words, the amount of Yb dopant). In addition, $x<1$ may be satisfied. Here, the value of "c" indicates the ratio of Yb to the sum of Zr and Yb. This ratio is calculated from the amounts of the charged starting raw materials. The value of "c" satisfies the expression $0<c<1$. The value of "c" may satisfy the expression: $0<c<0.4$. The electrolyte membrane 11 according to the present embodiment has a high proton conductivity of 0.24 ($10^{-2}$ s·cm$^{-1}$) or more at a temperature of 600 degrees Celsius. In the unlikely event that the electrolyte membrane does not have a region where the mathematical expression $(c+0.1)<x$ is satisfied, as demonstrated in Comparative Example 1, a low proton conductivity of 0.21 ($10^{-2}$ s·cm$^{-1}$) or less is exhibited at a temperature of 600 degrees Celsius.

The electrolyte material is synthesized by a citric acid complex method, a solid phase sintering method, a coprecipitation method, a nitrate method, or a spray granulation method.

Embodiment 2

Figure 2A:
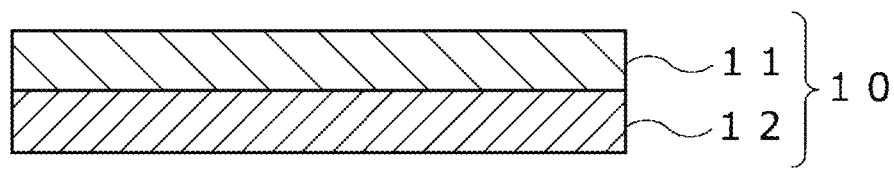
FIG. 2A is a cross-sectional view of a membrane electrode assembly according to an embodiment.

FIG. 2A shows a cross-section of a membrane electrode assembly 10 according to an embodiment 2. The membrane electrode assembly 10 includes an electrolyte membrane 11 and an electrode 12. In other words, an electrode 12 is arranged on one main surface of an electrolyte membrane 11.

The electrolyte membrane 11 is described in the embodiment 1. The thickness of the electrolyte membrane 11 is, for example, 1 to 50 μm.

The electrode 12 mainly includes at least one compound of the followings:
(i) the electrolyte material included in the electrolyte membrane and a mixture of Ni and at least one metal selected from the group consisting of Co, Fe, and Pt (i.e., cermet);
(ii) a complex oxide including lanthanum;
(iii) a complex oxide including barium; and
(iv) a complex oxide including strontium.

The electrode 12 has a thickness of, for example, 1 to 1000 μm. When the electrode 12 also serves as a support of the cell, the electrode 12 desirably has a thickness of 100 to 500 μm. When a member other than the electrode 12 serves as a support of the cell, the electrode 12 desirably has a thickness of 10 to 20 μm.

In FIG. 2A, the electrolyte membrane 11 and the electrode 12 are in contact with each other. However, another layer may be provided between the electrolyte membrane 11 and the electrode 12. An example of such another layer is a functional layer. The functional layer is a layer that promotes the movement of electrons or protons between the electrolyte membrane 11 and the electrode 12. The functional layer is, for example, constituted of a composite of a cermet and a complex oxide.

The electrolyte membrane is produced by a tape casting method, a spin coating method, a dip coating method, sputtering, or PLD (Pulse Laser Deposition). The electrolyte membrane is manufactured by mixing a material containing $BaZr_{1-d}M_dO_{3-\delta'}$ and a material containing $BaM_2O_4$ and then, for example, preparing an electrolyte ceramic slurry containing the mixed materials using a doctor blade method. Here, $0<d<1$ and $0<\delta'<1$ are satisfied, and M is a trivalent element and may be at least one element selected from Sc, In, Lu, and Yb. By manufacturing in this way, an electrolyte material in which the concentration of M in the first crystal subdomain and the concentration of M in the second crystal subdomain are different from each other can be produced. The manufacturing of the electrolyte membrane may include, for example, addition of a powder of $BaM_2O_4$ to a powder of $BaZr_{1-d}M_dO_{3-\delta'}$.

Embodiment 3

Figure 2B:
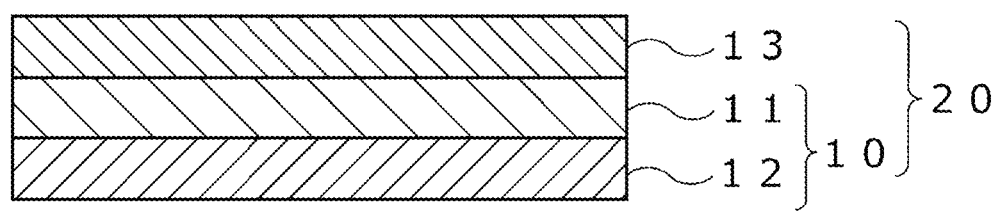
FIG. 2B is a cross-sectional view of an electrochemical cell according to an embodiment.

FIG. 2B shows a cross-section of an electrochemical cell 20 including a membrane electrode assembly 10.

The electrochemical cell 20 includes an electrode 12, an electrolyte membrane 11, and a counter electrode 13.

The membrane electrode assembly 10 has been described in the embodiment 2.

As shown in FIG. 2B, in the electrochemical cell 20, the electrode 12, the electrolyte membrane 11, and the counter electrode 13 are stacked in this order. That is, the electrolyte membrane 11 is sandwiched between the electrode 12 and the counter electrode 13. In other words, the electrolyte membrane 11 is arranged between the electrode 12 and the counter electrode 13.

When the counter electrode 13 functions as an air electrode, the counter electrode 13 includes a composite compound. For example, the counter electrode 13 mainly includes a lanthanum strontium cobalt oxide. The counter electrode 13 can be provided in the membrane electrode assembly 10 by a screen printing method.

As shown in FIG. 2B, the counter electrode 13 and the electrolyte membrane 11 are arranged to be in contact with each other, but the configuration is not limited thereto. Another layer may be disposed between the counter electrode 13 and the electrolyte membrane 11.

An example of such another layer is a functional layer. The functional layer has been described in the embodiment 2.

The electrochemical cell 20 can be used in a fuel cell, an electrochemical hydrogen pump, a hydrogen sensor, or a water electrolyzer.

Embodiment 4

Figure 3:
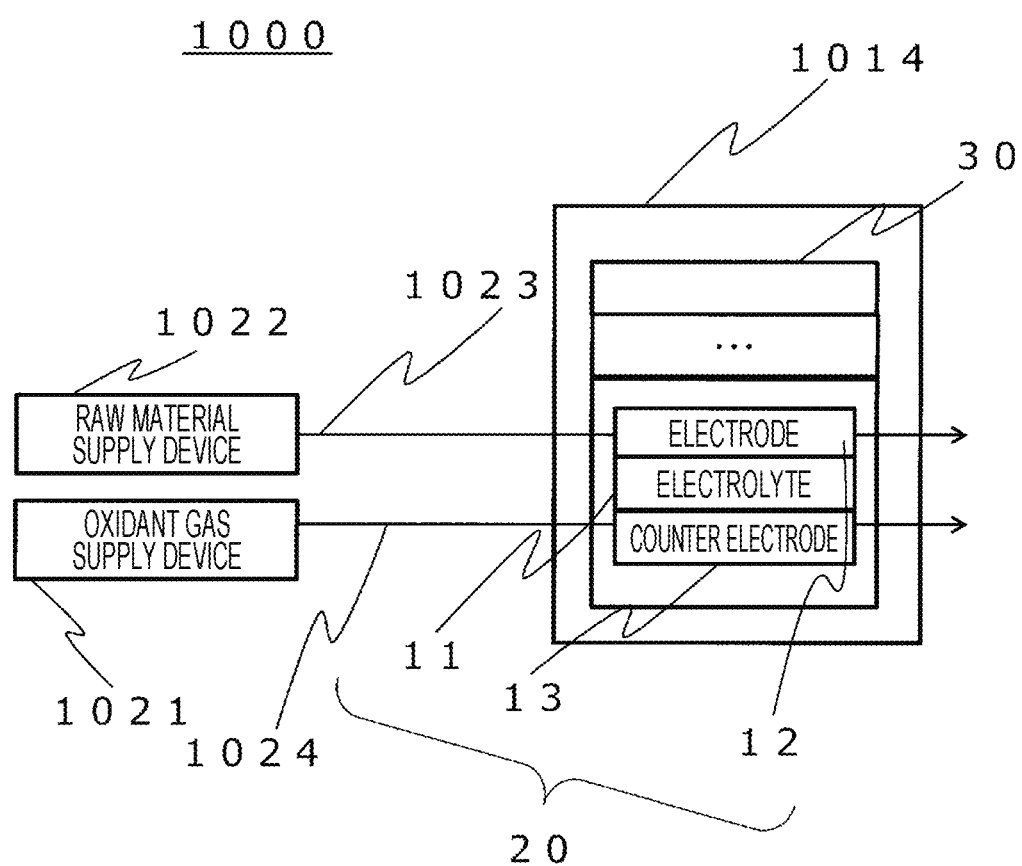
FIG. 3 illustrates a fuel cell system according to an embodiment.

FIG. 3 schematically illustrates a fuel cell system 1000 including an electrochemical cell.

The electrochemical cell 20 has been described in the embodiment 3.

A plurality of the electrochemical cells 20 is stacked to obtain a stack 30. The resulting stack 30 is stored in a housing 1014.

The housing 1014 may be made of a heat insulation member. An oxidant gas is supplied to the counter electrodes 13 of the stacked electrochemical cells 20.

Specifically, the oxidant gas is supplied to the counter electrodes 13 (i.e., cathodes) of a plurality of the electrochemical cells 20 from an oxidant gas supply device 1021 through an oxidant gas path 1024.

In the counter electrode 13, the following reaction (1) progresses.

$$O_2 + 4H^+ + 4e^- \rightarrow 2H_2O \qquad (1)$$

The oxidant gas is, for example, air.

A raw material is supplied to the electrode 12 from a raw material supply device 1022 through a raw material gas path 1023.

In the electrode 12, the following reaction (2) progresses.

$$2H_2 \rightarrow 4H^+ + 4e^- \quad (2)$$

The raw material is, for example, a hydrogen molecule.

Hydrogen may be generated by a reforming reaction. Alternatively, hydrogen may be generated by water electrolysis.

Thus, the fuel cell system 1000 works. Then, the fuel cell system 1000 generates electricity.

EXAMPLES

Production of Cell by Example and Comparative Example and Characteristic Evaluation The present disclosure will now be described in more detail with reference to the following Examples and Comparative Example. As described below, in Examples 1 and 2 and Comparative Example 1, electrolyte membranes and membrane electrode assembly/cells using them were produced. Then, each of the electrolyte membranes was analyzed, and the characteristics of each of the membrane electrode assembly/cells were evaluated.

Example 1

Figure 4:
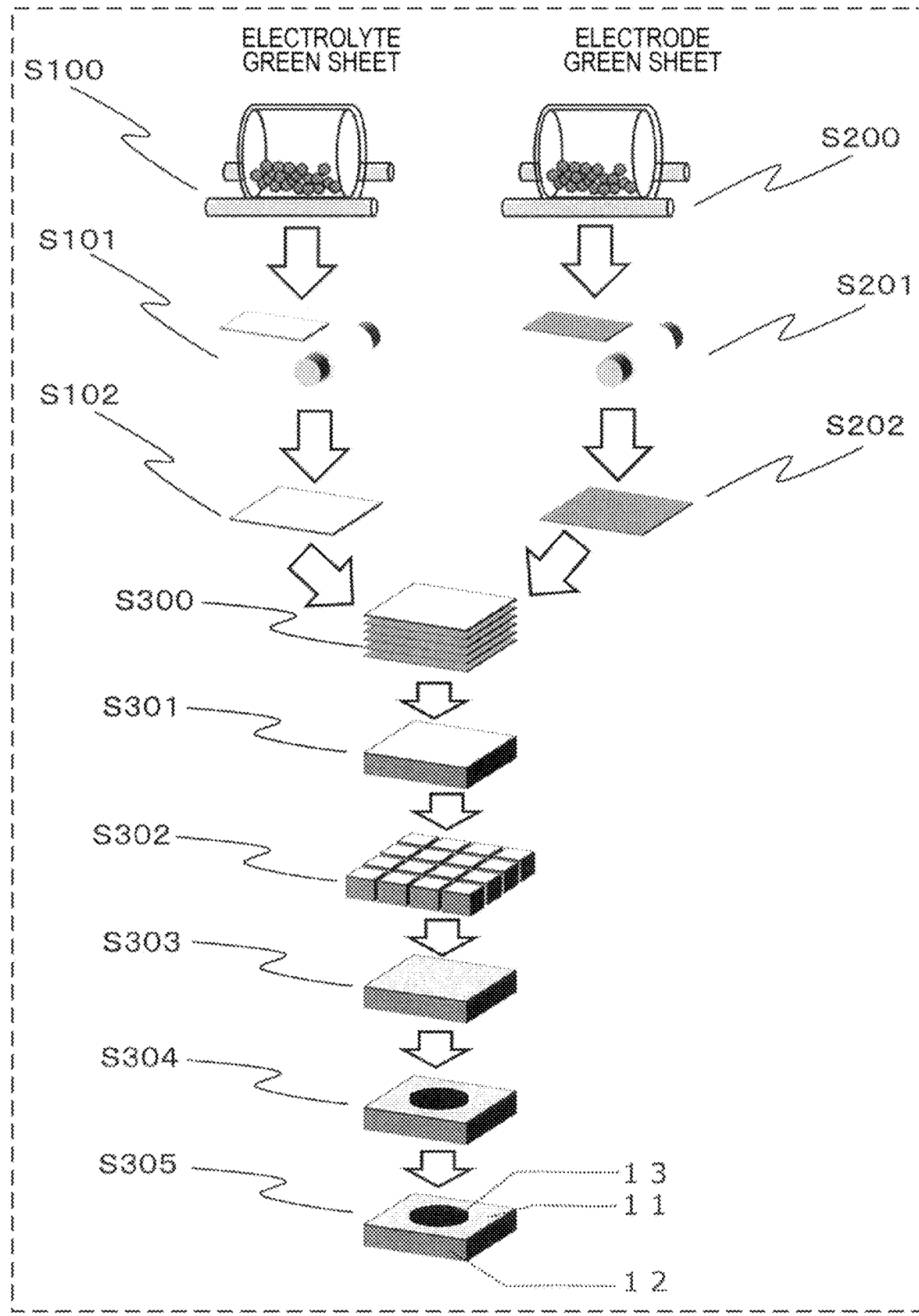
FIG. 4 shows a process of producing an electrolyte membrane, a membrane electrode assembly, and an electrochemical cell of an Example or a Comparative Example.

Production of Electrolyte Membrane and Membrane Electrode Assembly/Cell Using It Production of an electrolyte membrane and a membrane electrode assembly/cell using it will be described with reference to FIG. 4.
(1) Production of Electrolyte Green Sheet
(1A) Preparation of Electrolyte Ceramic Slurry (see S100)

Firstly, preparation of a ceramic slurry that is used for preparing an electrolyte green sheet will be described.

As starting raw materials of the electrolyte material, the following materials were prepared.

Ba(NO$_3$)$_2$ (manufactured by KANTO CHEMICAL CO., INC.): 0.100 mol,
ZrO(NO$_3$)$_2$·2H$_2$O (manufactured by KANTO CHEMICAL CO., INC.): 0.085 mol, and
Yb(NO$_3$)$_3$·xH$_2$O (2<x<6, manufactured by KOJUNDO CHEMICAL LABORATORY CO., LTD.): 0.015 mol.

The above-mentioned starting raw materials were added to distilled water to obtain a mixture, and the mixture was then stirred.

Then, citric acid monohydrate (0.1 mol, manufactured by KANTO CHEMICAL CO., INC.) and ethylenediaminetetraacetic acid (0.2 mol, manufactured by KANTO CHEMICAL CO., INC., hereinafter, "ethylenediaminetetraacetic acid" is referred to as EDTA) were added to the mixture. Subsequently, the mixture was stirred at a temperature of 90° C.

Then, ammonia water (28 wt %, manufactured by KANTO CHEMICAL CO., INC.) was added to the mixture. Subsequently, the pH of the mixture was adjusted to 7 at a temperature of 90° C. using a pH meter (manufactured by HORIBA, LTD).

After the adjustment of the pH of the mixture to 7, the temperature of the mixture was raised from 95° C. to 240° C. using a hot stirrer to evaporate the solvent (i.e., water). The water was thus removed from the mixture to obtain a solid.

The resulting solid was pulverized in a mortar and was then degreased at a temperature of about 400° C. Thus, a powder was obtained.

The resulting powder was pressed into a cylindrical form using a hydraulic pump (manufactured by ENERPAC CO., LTD) and a powder molding die having a diameter of 30 mm. Thus, a cylindrical molded product was obtained.

Subsequently, the resulting cylindrical molded product was subjected to preliminary heat treatment at 900° C. for 10 hours in the atmosphere. Thus, a preliminarily heat-treated powder was obtained.

Then, the preliminarily heat-treated powder was pulverized. Subsequently, the pulverized powder was transferred to a plastic container together with zirconia balls.

Then, ethanol (100 g, manufactured by KANTO CHEMICAL CO., INC.) was added to the plastic container. Thus, a mixture was obtained. Subsequently, the mixture was pulverized with a ball mill for 4 days.

After pulverization with the ball mill, the mixture was dried using a lamp to remove the ethanol from the mixture. Thus, a powder was obtained.

The resulting powder was subjected to main heat treatment at 1200° C. for 5 hours in the atmosphere. At this stage, a material corresponding to BaZr$_{1-d}$M$_d$O$_{3-\delta'}$ (M is Yb) was produced. A powder of BaYb$_2$O$_4$ (3 mol % based on the powder subjected to main heat treatment) was further added to the powder subjected to main heat treatment to prepare an electrolyte material of Ba$_{0.97}$Zr$_{0.80}$Yb$_{0.20}$O$_{3-\delta}$ ($\delta$ is the amount of oxygen deficiency, 0<$\delta$<1.0).

Subsequently, the following materials were mixed to prepare an electrolyte ceramic slurry (see S100).

Electrolyte material of Ba$_{0.97}$Zr$_{0.80}$Yb$_{0.20}$O$_{3-\delta}$: 50 g,
Polyvinyl butyral (manufactured by SEKISUI CHEMICAL CO., LTD): 5 g,
Butyl benzyl phthalate (manufactured by KANTO CHEMICAL CO., INC.): 1.25 g, and
Solvent mixture: 40 g.

The solvent mixture was composed of butyl acetate (20 g, manufactured by KANTO CHEMICAL CO., INC.) and 1-butanol (20 g, manufactured by KANTO CHEMICAL CO., INC.). Thus, an electrolyte ceramic slurry was prepared.
(1B) Preparation of Electrolyte Green Sheet (See S101 and S102)

Subsequently, a membrane consisting of the electrolyte ceramic slurry was formed on a support sheet of a polyethylene terephthalate film having a thickness of about 50 μm by a doctor blade method (see S101). The resulting membrane made of the slurry was heated at a temperature of 80° C. to evaporate the solvent. Thus, an electrolyte green sheet was produced (see S102). The electrolyte green sheet had a thickness of about 21 μm.
(2) Production of Electrode Green Sheet An electrode green sheet was produced as in the method for producing the electrolyte green sheet except for the matters detailed below.
(2A) Preparation of Electrode Ceramic Slurry (see S200)

An electrolyte material was prepared as in the method for preparing an electrolyte material of Ba$_{1.00}$Zr$_{0.85}$Yb$_{0.15}$O$_{3-\delta}$ ($\delta$ is the amount of oxygen deficiency, 0<$\delta$<1.0) except that the following materials were prepared as the starting materials of the electrode instead of the starting raw materials of the electrolyte material.

Ba(NO$_3$)$_2$ (manufactured by KANTO CHEMICAL CO., INC.): 0.097 mol,
ZrO(NO$_3$)$_2$·2H$_2$O (manufactured by KANTO CHEMICAL CO., INC.): 0.08 mol, and
Yb(NO$_3$)$_3$·xH$_2$O (2<x<6, manufactured by KOJUNDO CHEMICAL LABORATORY CO., LTD.): 0.02 mol.

Thus, an electrolyte material of Ba$_{0.97}$Zr$_{0.8}$Yb$_{0.2}$O$_{3-\delta}$ was obtained instead of Ba$_{1.00}$Zr$_{0.85}$Yb$_{0.15}$O$_{3-\delta}$ ($\delta$ is the amount of oxygen deficiency, 0<$\delta$<1.0).

An electrode ceramic slurry was prepared by mixing the following materials.

Electrolyte material of $Ba_{0.97}Zr_{0.8}Yb_{0.2}O_{3-\delta}$: 20 g,
Polyvinyl butyral (manufactured by SEKISUI CHEMICAL CO., LTD): 5 g,
Butyl benzyl phthalate (manufactured by KANTO CHEMICAL CO., INC.): 1.25 g,
NiO (manufactured by SUMITOMO METAL MINING CO., LTD): 30 g, and
Solvent mixture: 40 g.

The solvent mixture was composed of butyl acetate (20 g, manufactured by KANTO CHEMICAL CO., INC.) and 1-butanol (20 g, manufactured by KANTO CHEMICAL CO., INC.).

Subsequently, a membrane consisting of the electrode ceramic slurry was formed on a support sheet of a polyethylene terephthalate film having a thickness of about 50 μm by a doctor blade method (see S201). The membrane made of the slurry had a thickness of about 30 μm. The resulting membrane made of the slurry was heated at a temperature of 80° C. Thus, an electrode green sheet was produced.

(3) Stacking of Sheets (See from S300 to S303)

The electrolyte green sheet was cut to obtain one cut electrolyte green sheet. Subsequently, the polyethylene terephthalate film was peeled off from the electrolyte green sheet. The one cut electrolyte green sheet had a size of 140 mm×140 mm. The electrode green sheet was cut to obtain one cut electrode green sheet. The one cut electrode green sheet had a size of 140 mm×140 mm.

A plurality of cut electrode green sheets were stacked to obtain a laminate. The resulting laminate had a thickness of about 700 μm.

Subsequently, the laminate was hot pressed. The hot pressing was performed under conditions of 85° C. and 13 MPa. Thus, an electrode was produced.

Furthermore, one cut electrolyte green sheet was stacked on one main surface of the electrode to obtain a laminate (see S300). Then, the resulting laminate was hot pressed.

The hot pressing was performed under conditions of 80° C. and 13 MPa. Thus, a compact was obtained.

The resulting compact was further pressed with a pressure of 50 MPa using a pressing machine (manufactured by Sansho Industry Co., Ltd.) to obtain a laminate (see S301). The thickness was almost unchanged to be about 700 μm.

The laminate was cut to a size of 20 mm×20 mm (see S302).

Finally, the cut laminate was heat treated at 1400° C. for 2 hours in the atmosphere. Thus, a membrane electrode assembly of Example 1 was produced (see S303, the drawing shows one cut laminate). The membrane electrode assembly was an assembly of an electrolyte membrane and an electrode.

(4) Formation of Counter Electrode (See S304 and S305)

Furthermore, a counter electrode was provided to the resulting membrane electrode assembly. The counter electrode was provided as follows. As the starting raw materials of the counter electrode, the following materials were prepared.

NiO (manufactured by SUMITOMO METAL MINING CO., LTD): 5 g,
Polyethylene glycol 400 (manufactured by FUJIFILM WAKO PURE CHEMICAL CORPORATION): 1 g, and
Ethanol (manufactured by KANTO CHEMICAL CO., INC.): 40 g.

Each of the starting raw materials was placed in a ball mill, and they were mixed. Thus, a mixture was obtained. Then, the resulting mixture was heated up to 150° C. using a hot stirrer. Thus, a NiO paste was obtained.

Subsequently, the NiO paste was applied to one main surface exposing the electrolyte membrane of the membrane electrode assembly by a screen printing method (see S304). The applied NiO paste had a diameter of 10 mm. Thus, a precursor of a cell was obtained.

Then, the precursor of a cell was heat treated at 1400° C. for 2 hours in the atmosphere. Thus, a cell of Example 1 was produced (see S305).

Cell Analysis 1: STEM Analysis and EDX Analysis

The electrolyte membrane of the cell of Example 1 was analyzed with a STEM. Specifically, the resulting membrane electrode assembly was cut, and a cross section of the membrane electrode assembly was analyzed with a STEM. Hereinafter, analysis with a STEM may be referred to as "STEM analysis".

The STEM used for the analysis was JEM-F200 (manufactured by JEOL LTD.). The STEM analysis was performed at an acceleration voltage of 200 kV.

FIG. 5 is a bright field STEM image of an electrolyte membrane. The circles shown in FIG. 5 are positions analyzed with EDX. Hereinafter, analysis with EDX may be referred to as "EDX analysis".

The ratios (i.e., weight ratios) of Zr and Yb elements were calculated from the characteristic X-ray intensity obtained by EDX analysis using the well-known Cliff-Lorimer method. Table 1 shows the ratios of Zr and Yb at all analysis positions.

Cell Analysis 2: Analysis with FE-EPMA

The electrolyte membrane of Example 1 was analyzed with an FE-EPMA. Hereinafter, analysis with an FE-EPMA may be referred to as "FE-EPMA analysis".

The FE-EPMA used for the analysis was EPMA-8050G (manufactured by SHIMADZU CORPORATION). The analysis was performed at an acceleration voltage of 15 kV and an illumination current of 100 nA with the FE-EPMA. An area of 40×30 μm including the electrolyte membrane was analyzed.

Figure 6A:
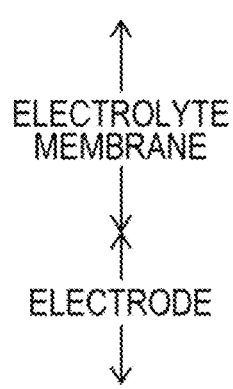
FIG. 6A is the FE-EPMA data (unit: count number) of Yb element of the membrane electrode assembly of Example 1.
Figure 6A:
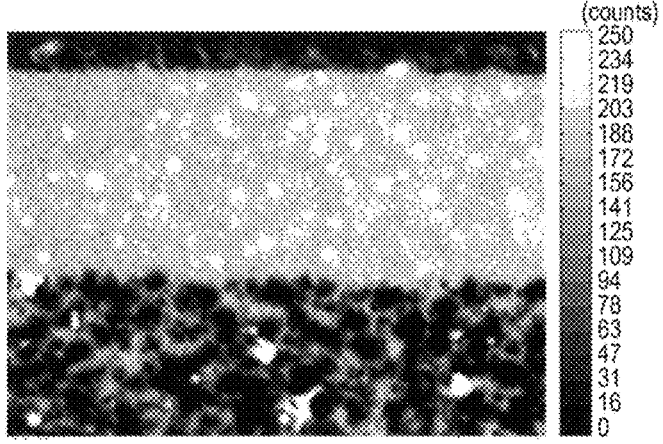
Figure 6B:
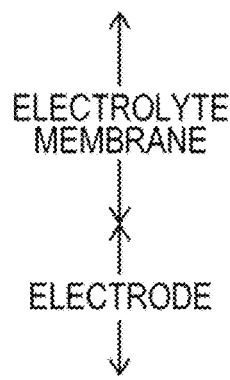
FIG. 6B is the FE-EPMA data (unit: wt %) of Yb element of the membrane electrode assembly of Example 1.
Figure 6B:
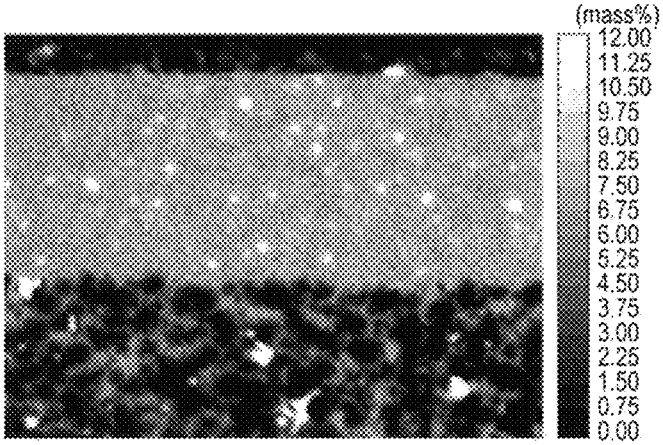

FIGS. 6A and 6B are data output from the FE-EPMA. FIG. 6A shows the number of counts of Yb based on the weight of various elements. Incidentally, the resulting number of counts is the absolute value. The bar on the right side of FIG. 6A indicates the relationship between the shading on FIG. 6A and the number of counts.

FIG. 6B is a graph obtained by converting FIG. 6A to relative values (i.e., wt %).

Furthermore, the average value, the maximum value, and the minimum value of wt % of Yb in a 3×3 μm square region of the electrolyte membrane were output from EPMA-8050G (manufactured by SHIMADZU CORPORATION).

Table 2 shows data indicating the average value, the maximum value, and the minimum value of wt % of Yb in a 3×3 μm square region of the electrolyte membrane.

Concentrations of Zr and Yb at each analysis point were determined based on the data of FIG. 6A.

The number of counts were converted to concentrations (i.e., wt %) based on the data of FIG. 6A by a calibration curve method. The number of analysis points was 15000.

The value of Yb/(Zr+Yb) (i.e., the composition ratio of Yb) was calculated based on the wt % at 15000 analysis points. Furthermore, correction was performed such that the average value of the 15000 analysis points was Yb/(Zr+Yb)= 0.2 (i.e., the average composition of the electrolyte membrane, which may be referred to as "c"). This average composition of the electrolyte membrane is calculated from the amounts of the charged starting raw materials.

Then, the value of Yb/(Zr+Yb) at each analysis point and the proportion of a predetermined value of Yb/(Zr+Yb) in the values at the 15000 analysis points were determined.

FIG. 7 is a graph showing the value of Yb/(Zr+Yb) at each analysis point and the proportion of the analysis points having a predetermined Yb/(Zr+Yb) value in the 15000 analysis points.

The "Yb proportion" shown in FIG. 7 is the value of Yb/(Zr+Yb). The "Frequency (%)" shown in FIG. 7 is the proportion of a predetermined value of Yb/(Zr+Yb) in the electrolyte membrane.

Cell Analysis 3: Proton Conductivity of Electrolyte Membrane

The proton conductivity of an electrolyte membrane was calculated from the resistance of the electrolyte membrane and the thickness of the electrolyte membrane using the cell of Example 1. The resistance of the electrolyte membrane is based on an alternating current impedance method. The proton conductivity of the electrolyte membrane was determined as follows.

Figure 8:
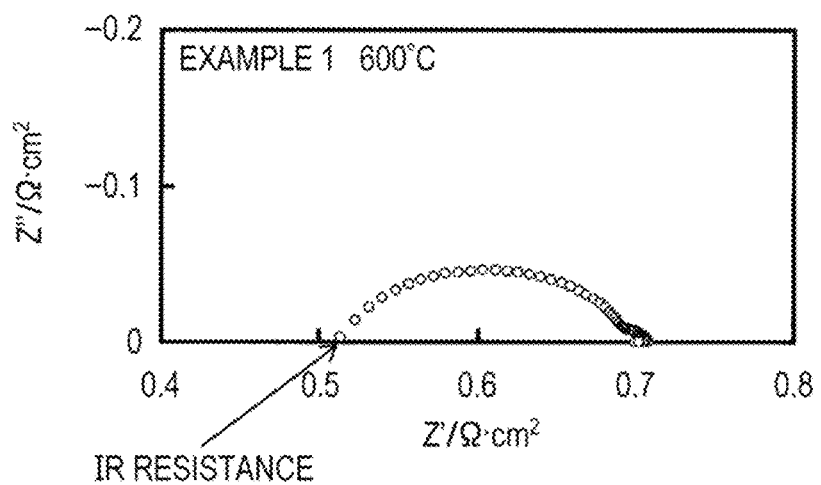
FIG. 8 shows Cole-Cole plots of the cell of Example 1.

An alternating current was applied to the cell (conditions: in a humidified hydrogen atmosphere at a temperature of 600° C.) at an amplitude of 10 mV and also within a frequency range of from 0.01 Hz to 1 MHz using ModuLab XM ECS (manufactured by SOLARTRON ANALYTICAL). Then, Cole-Cole plots were output (see FIG. 8). Based on the circular arc of the output Cole-Cole plots in the frequency range of from 0.01 Hz to 100 kHz (see FIG. 8), the intersection point of the circular arc and a real number axis was determined. The real number axis is the axis in which the value of the Y axis in the graph of FIG. 8 is 0. Then, the intersection point on the higher frequency side among the determined intersection points was defined as the IR resistance (see FIG. 8).

The proton conductivity (unit: $10^{-2}$ s·cm$^{-1}$) of the electrolyte membrane of the cell was calculated based on the determined IR resistance and the thickness of the electrolyte membrane.

Incidentally, the resistance of the electrolyte membrane was also measured at each of the temperatures of 500° C. and 700° C.

Table 3 shows the proton conductivity (unit: $10^{-2}$ s·cm$^{-1}$) of the electrolyte membrane at each temperature.

Example 2

Figure 10A:
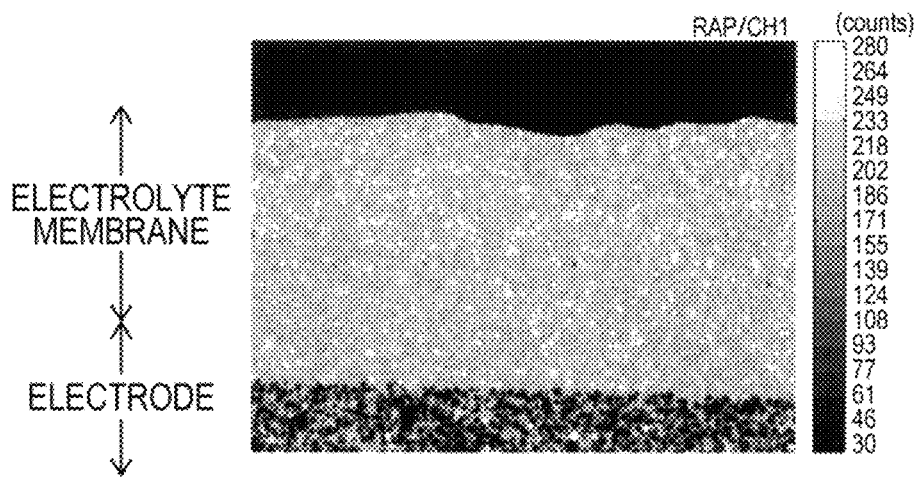
FIG. 10A is the FE-EPMA data (unit: count number) of Yb element of the membrane electrode assembly of Example 2.
Figure 10B:
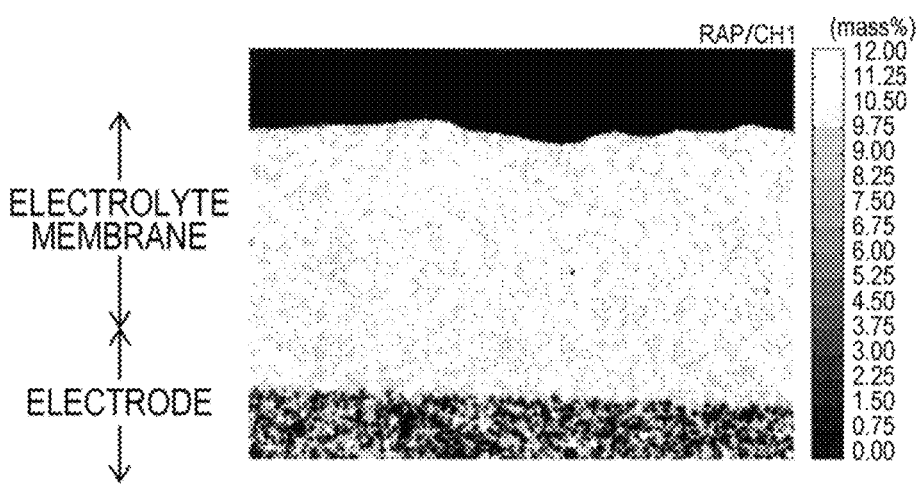
FIG. 10B is the FE-EPMA data (unit: wt %) of Yb element of the membrane electrode assembly of Example 2.

In Example 2, an electrolyte membrane of Example 2 and a membrane electrode assembly/cell using it were produced by the same method as in Example 1, except for the following steps. Then, the electrolyte membrane was analyzed. Subsequently, the characteristics of the membrane electrode assembly/cell were evaluated. FIG. 9 and Table 1 show the results of STEM analysis and EDX analysis. FIGS. 10A and 10B and Table 2 show the results of FE-EPMA analysis. Table 3 shows the results of calculation of proton conductivity of the cell.

(1) As the starting raw materials of electrolyte material, the following materials were prepared.

Ba(NO$_3$)$_2$ (manufactured by KANTO CHEMICAL CO., INC.): 0.098 mol,
ZrO(NO$_3$)$_2$·2H$_2$O (manufactured by KANTO CHEMICAL CO., INC.): 0.081 mol, and
Yb(NO$_3$)$_3$·xH$_2$O (3<x<6, manufactured by KOJUNDO CHEMICAL LABORATORY CO., LTD.): 0.019 mol.

(2) In the step of preparing an electrolyte ceramic slurry, the amount of BaYb$_2$O$_4$ powder added to the powder subjected to main heat treatment was 1 mol %.

Comparative Example 1

Figure 12:
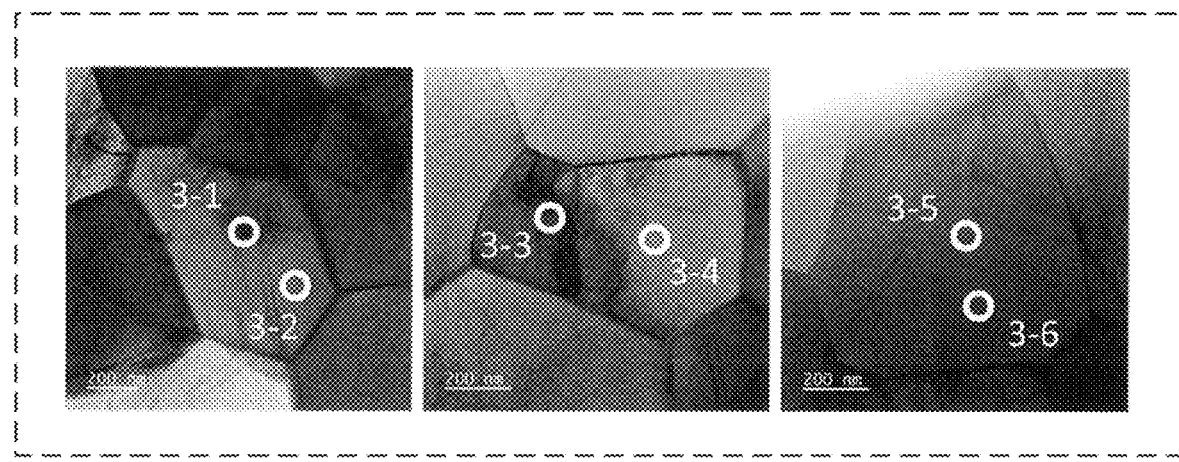
FIG. 12 shows cross-sectional STEM images of the electrolyte membrane of Comparative Example 1.
Figure 13A:
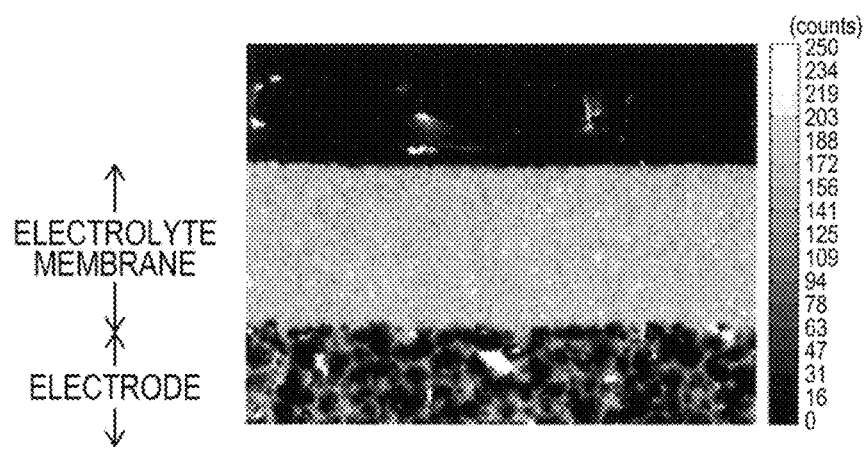
FIG. 13A is the FE-EPMA data (unit: count number) of Yb element of the membrane electrode assembly of Comparative Example 1.
Figure 13B:
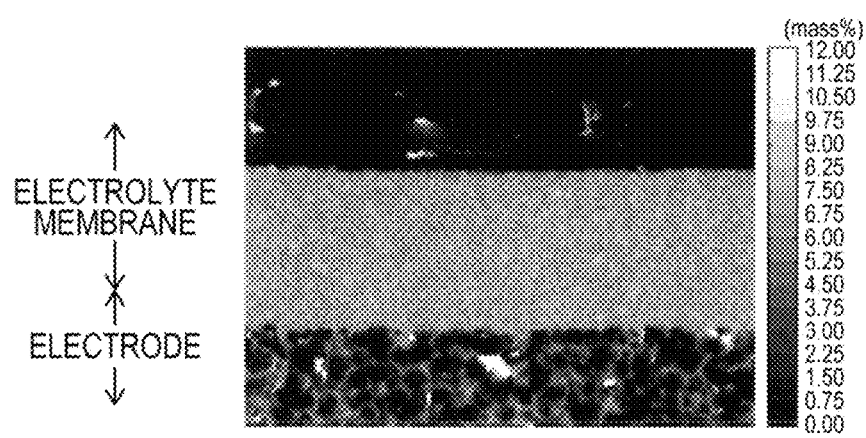
FIG. 13B is the FE-EPMA data (unit: wt %) of Yb element of the membrane electrode assembly of Comparative Example 1.

In Comparative Example 1, an electrolyte membrane of Comparative Example 1 and a membrane electrode assembly/cell using it were produced by the same method as in Example 1, except for the following steps. Then, the electrolyte membrane was analyzed. Subsequently, the characteristics of the membrane electrode assembly/cell were evaluated. FIG. 12 and Table 1 show the results of STEM analysis and EDX analysis. FIGS. 13A and 13B and Table 2 show the results of FE-EPMA analysis. Table 3 shows the results of calculation of proton conductivity of the cell.

(1) As the starting raw materials of electrolyte material, the following materials were prepared.

Ba(NO$_3$)$_2$ (manufactured by KANTO CHEMICAL CO., INC.): 0.097 mol,
ZrO(NO$_3$)$_2$·2H$_2$O (manufactured by KANTO CHEMICAL CO., INC.): 0.080 mol, and
Yb(NO$_3$)$_3$·xH$_2$O (3<x<6, manufactured by KOJUNDO CHEMICAL LABORATORY CO., LTD.): 0.020 mol.

(2) In the step of preparing an electrolyte ceramic slurry, BaYb$_2$O$_4$ powder was not added to the powder subjected to main heat treatment.

Results of Characteristic Evaluation
Cell Analysis 1: STEM Analysis and EDX Analysis Based on FIGS. 5, 9, and 12 and Table 1, the results of STEM analysis and EDX analysis will be described. As shown in FIGS. 5 and 9, the electrolyte membranes of Examples 1 and 2 are crystalline. The crystalline electrolyte membrane is composed of a plurality of crystal domains. Each crystal domain is composed of a first crystal subdomain and a second crystal subdomain. The first crystal subdomain is surrounded by the second crystal subdomain. In other words, the first crystal subdomain is positioned near the center of each crystal domain. On the other hand, the second crystal subdomain is positioned near the periphery of each crystal domain.

As shown in FIG. 5, the analysis positions 1-1, 1-3, and 1-5 are positions that are visually observed as black. These analysis positions are first crystal subdomains. In analysis of these first crystal subdomains with EDX, as shown in Table 1, the concentration of Yb was higher than the concentration of Zr. On the other hand, as shown in FIG. 5, the analysis positions 1-2, 1-4, and 1-6 are positions that are visually observed as white. These analysis positions are second crystal subdomains. In analysis of these second crystal subdomains with EDX, as shown in Table 1, the concentration of Zr was higher than that of Yb.

As shown in FIG. 9, the analysis positions 2-1 and 2-3 are positions that are visually observed as black. These analysis positions are first crystal subdomains. In analysis of these first crystal subdomains with EDX, as shown in Table 1, the concentration of Yb was higher than the concentration of Zr. On the other hand, as shown in FIG. 9, the analysis positions 2-2 and 2-4 are positions that are visually observed as white. These analysis positions are second crystal subdomains. In analysis of these second crystal subdomains with EDX, as shown in Table 1, the concentration of Zr was higher than that of Yb. The analysis positions 2-5 and 2-6 are both portions that are visually observed as white. Accordingly, the crystal domains of the analysis positions 2-5 and 2-6 do not have crystal subdomains.

As shown in FIG. 12, the crystal domains constituting the electrolyte membrane of Comparative Example 1 did not have crystal subdomains. In analysis of the electrolyte membrane of Comparative Example 1 with EDX, the concentration of Zr was higher than the concentration of Yb at every analysis position.

Accordingly, the electrolyte membrane of Comparative Example 1 was an electrolyte membrane having a homogeneous concentration of Yb, compared to the electrolyte membranes of Examples 1 and 2.

In other words, the electrolyte membranes of Examples 1 and 2 had positions having uneven distribution of the concentration of Yb, compared to Comparative Example 1.

From Examples 1 and 2, in an electrolyte membrane having uneven distribution of the concentration of Yb, the difference in Yb/(Zr+Yb) measured in each crystal domain is 0.28 or more. Specifically, the difference in Yb/(Zr+Yb) was 0.29 or more.

Accordingly, the electrolyte membranes of Examples 1 and 2 each included a plurality of crystal domains. In addition, at least one of the crystal domains included a first crystal subdomain and a second crystal subdomain in the inside thereof. The concentration of M in the first crystal subdomain and the concentration of M in the second crystal subdomain were different from each other. The concentration of M in the first crystal subdomain was higher than the concentration of M in the second crystal subdomain. The first crystal subdomain is surrounded by the second crystal subdomain. The first crystal subdomain was represented by a chemical formula of $BaZr_{1-a}Yb_aO_{3-\delta}$, and the second crystal subdomain was represented by a chemical formula of $BaZr_{1-b}Yb_bO_{3-\delta}$. Here, the respective chemical formulae satisfied $0<a<1$, $0<b<1$, $0<\delta<1$, and $a-b \geq 0.28$.

Cell Analysis 2: Analysis by FE-EPMA

Based on FIGS. 7, 11, and 14, the results of FE-EPMA analysis will be described.

As the Yb proportion that was the farthest from Yb/(Zr+Yb)=0.2 (i.e., the Yb proportion when taking the average composition. In other words, the Yb proportion of the composition formula of $BaZr_{0.8}Yb_{0.2}O_{3-\delta}$ ($\delta$ is the amount of oxygen deficiency, $0<\delta<1$)), Yb/(Zr+Yb)=0.49 in Example 1, Yb/(Zr+Yb)=0.32 in Example 2, and Yb/(Zr+Yb)=0.30 in Comparative Example 1.

As shown in Comparative Example 1, when an electrolyte membrane having a homogenous concentration of Yb compared to Examples 1 and 2 was produced, the Yb proportion determined by FE-EPMA analysis was within the range of the average composition value (i.e., 0.2)+0.1.

On the other hand, in Examples 1 and 2, the Yb proportions determined by FE-EPMA analysis were outside the average composition value+0.1. In other words, in Examples 1 and 2, at least a part of the Yb proportions determined by FE-EPMA analysis had a value larger than the average composition value+0.1. Accordingly, it was revealed that in the electrolyte membranes of Examples 1 and 2, the distribution of the Yb concentration was not homogeneous compared to Comparative Example 1 (that is, the Yb concentration was unevenly distributed in the electrolyte membrane. In addition, the concentrations of Yb of the first crystal subdomain and the second crystal subdomain were different from each other).

Accordingly, the electrolyte membranes of Examples 1 and 2 each include a barium zirconate compound doped with ytterbium. In addition, a 3×3 μm square region represented by a composition formula of $BaZr_{1-x}Yb_xO_{3-\delta}$ ($0<c<1$, $c+0.1<x$, and $0<\delta<1$) is present on the electrolyte membrane.

Subsequently, the results of FE-EPMA analysis will be described based on Table 2.

The data by FE-EPMA analysis were output. Then, the maximum value, the minimum value, and the average value of wt % of Yb in a 3×3 μm region on each electrolyte membrane and the value of "(the maximum value)–(the average value)" were determined. In Examples 1 and 2, the value of "(the maximum value)–(the average value)" was 5 or more. Specifically, the value of "(the maximum value)–(the average value)" was 6.2 in Example 1 and was 5.6 in Example 2. In contrast, in Comparative Example 1, the value of "(the maximum value)–(the average value)" was 2.0. Accordingly, it was revealed that the difference in Yb concentration in each of the electrolyte membranes of Examples 1 and 2 was large compared to that in the electrolyte membrane of Comparative Example 1. In other words, the electrolyte membranes of Examples 1 and 2 each contained a barium zirconate compound doped with ytterbium. In the electrolyte membrane of Comparative Example 1, the result was that the concentration of M in the first crystal subdomain and the concentration of M in the second crystal subdomain were substantially the same. Then, a 3×3 μm area of the electrolyte membrane was analyzed with an electron probe microanalyzer, and the data were output. The value of "(the maximum value of wt % of Yb)–(the average value of wt % of Yb)" per unit area of the output data was 5% or more.

Cell Analysis 3: Proton Conductivity of Cell

The proton conductivity of each electrolyte membrane will be described based on Table 3.

The cells of Examples 1 and 2 each had a high proton conductivity at each temperature (i.e., 500° C., 600° C., and 700° C.) compared to the cell of Comparative Example 1. Accordingly, it was revealed that an electrolyte membrane having uneven distribution of the concentration of Yb and a cell including the electrolyte membrane were improved in the proton conductivity.

TABLE 1

| | | EDX analysis | | |
|---|---|---|---|---|
| | Analysis position | Zr/(Zr + Yb) | Yb/(Zr + Yb) | Difference in measured Yb/(Zr + Yb) |
| Example 1 | 1-1 | 0.333 | 0.667 | 0.291 |
| | 1-2 | 0.624 | 0.376 | |
| | 1-3 | 0.290 | 0.710 | 0.358 |
| | 1-4 | 0.648 | 0.352 | |
| | 1-5 | 0.292 | 0.708 | 0.369 |
| | 1-6 | 0.661 | 0.339 | |
| Example 2 | 2-1 | 0.258 | 0.742 | 0.407 |
| | 2-2 | 0.665 | 0.335 | |
| | 2-3 | 0.278 | 0.722 | 0.369 |
| | 2-4 | 0.647 | 0.353 | |
| | 2-5 | 0.650 | 0.350 | 0.013 |
| | 2-6 | 0.637 | 0.363 | |
| Comparative Example 1 | 3-1 | 0.521 | 0.479 | 0.156 |
| | 3-2 | 0.677 | 0.323 | |
| | 3-3 | 0.518 | 0.482 | 0.109 |
| | 3-4 | 0.627 | 0.373 | |
| | 3-5 | 0.627 | 0.373 | 0.004 |
| | 3-6 | 0.623 | 0.377 | |

TABLE 2

| | FE-EPMA analysis | | | |
| --- | --- | --- | --- | --- |
| | Maximum value | Minimum value | Average value | Value of "(maximum value) − (average value)" |
| Example 1 | 13.7 | 5.5 | 7.5 | 6.2 |
| Example 2 | 17.2 | 8.6 | 11.6 | 5.6 |
| Comparative Example 1 | 9.1 | 5.5 | 7.1 | 2.0 |

TABLE 3

| | 500° C. | 600° C. | 700° C. |
| --- | --- | --- | --- |
| Example 1 | 0.24 | 0.26 | 0.26 |
| Example 2 | 0.19 | 0.24 | 0.24 |
| Comparative Example 1 | 0.18 | 0.21 | 0.22 |

The electrolyte membrane according to the present disclosure can be suitably used in an electrochemical cell or a fuel cell.

What is claimed is:

1. An electrolyte membrane comprising:
   a plurality of crystal domains,
   wherein;
   at least one of the crystal domains includes a first crystal subdomain and a second crystal subdomain,
   each of the first crystal subdomain and the second crystal subdomain includes Ba, Zr, M, and O,
   M is a trivalent element,
   a concentration of M in the first crystal subdomain is different from a concentration of M in the second crystal subdomain,
   the first crystal subdomain is represented by a chemical formula of $BaZr_{1-a}Yb_aO_{3-\delta}$, and
   the second crystal subdomain is represented by a chemical formula of $BaZr_{1-b}Yb_bO_{3-\delta}$,
   wherein
   $0<a<1.0<b<1.0<\delta<1$, and $(a-b)\geq 0.28$ are satisfied.

2. The electrolyte membrane according to claim 1, wherein
   the concentration of M in the first crystal subdomain is higher than the concentration of M in the second crystal subdomain, and
   the first crystal subdomain is surrounded by the second crystal subdomain.

3. The electrolyte membrane according to claim 1, wherein
   a mathematical expression $(a-b)\geq 0.30$ is satisfied.

4. The electrolyte membrane according to claim 3, wherein
   a mathematical expression $(a-b)\geq 0.35$ is satisfied.

5. A membrane electrode assembly comprising:
   the electrolyte membrane according to claim 1; and
   an electrode provided on the electrolyte membrane.

6. An electrochemical cell comprising:
   an electrode;
   the electrolyte membrane according to claim 1; and
   a counter electrode,
   wherein
   the electrolyte membrane is arranged between the electrode and the counter electrode.

* * * * *